United States Patent
Husek et al.

(10) Patent No.: US 10,752,184 B2
(45) Date of Patent: Aug. 25, 2020

(54) TRIM STRIP ASSEMBLY FOR VEHICLE AND METHOD OF MANUFACTURING SAME

(71) Applicant: Henniges Automotive Sealing Systems North America, Inc., Wilmington, DE (US)

(72) Inventors: Petr Husek, Mlada Boleslav (CZ); Daniel Slavik, Bela pod Bezdezem (CZ); Achim Grüter, Brueggen (DE)

(73) Assignee: Henniges Automotive Sealing Systems North America, Inc., Farmington Hills, MI (US)

( * ) Notice: Subject to any disclaimer, the term of this patent is extended or adjusted under 35 U.S.C. 154(b) by 318 days.

(21) Appl. No.: 15/737,831

(22) PCT Filed: Jun. 20, 2016

(86) PCT No.: PCT/US2016/038373
§ 371 (c)(1),
(2) Date: Dec. 19, 2017

(87) PCT Pub. No.: WO2016/205799
PCT Pub. Date: Dec. 22, 2016

(65) Prior Publication Data
US 2018/0244215 A1     Aug. 30, 2018

Related U.S. Application Data
(60) Provisional application No. 62/181,844, filed on Jun. 19, 2015.

(51) Int. Cl.
*B60R 13/02*     (2006.01)
*B60J 10/23*     (2016.01)
(Continued)

(52) U.S. Cl.
CPC .... *B60R 13/0243* (2013.01); *B29C 45/14409* (2013.01); *B29C 45/14434* (2013.01);
(Continued)

(58) Field of Classification Search
CPC ... B60J 10/15; B60J 10/23; B60J 10/32; B60J 10/45; B60J 10/70; B60J 10/75;
(Continued)

(56) References Cited

U.S. PATENT DOCUMENTS

| RE21,769 | E | 4/1941 | Tinnerman |
| 3,922,460 | A | 11/1975 | Jackson |

(Continued)

FOREIGN PATENT DOCUMENTS

| CN | 1921997 A | 2/2007 |
| CN | 201376273 Y | 1/2010 |

(Continued)

OTHER PUBLICATIONS

Supplementary European Search Report for Application No. EP16812622 dated Jan. 14, 2019, 2 pages.
(Continued)

*Primary Examiner* — Joseph D. Pape
(74) *Attorney, Agent, or Firm* — Howard & Howard Attorneys PLLC (57) ABSTRACT

A trim strip assembly for a vehicle and method of making the same is provided. The trim strip assembly includes a first trim portion. The first trim portion has a polymeric base and a first decorative member bonded to the polymeric base. The polymeric base is formed of polymeric material molded to the first decorative member. The polymeric base includes a first coupling member. A second trim portion has an extruded base and a second decorative member bonded to the extruded base. The extruded base and the second decorative member are coextruded. The extruded base includes a
(Continued)

second coupling member. The first coupling member is bonded to the second coupling member to interconnect the first trim portion and the second trim portion.

28 Claims, 11 Drawing Sheets

(51) Int. Cl.
| | |
|---|---|
| *B60J 10/32* | (2016.01) |
| *B60J 10/75* | (2016.01) |
| *B29C 45/14* | (2006.01) |
| *B29C 69/02* | (2006.01) |
| *B60R 13/04* | (2006.01) |
| *B29C 48/16* | (2019.01) |
| *B60R 13/06* | (2006.01) |
| *B60J 10/15* | (2016.01) |
| *B60J 10/00* | (2016.01) |
| *B60J 10/70* | (2016.01) |
| *B60J 1/00* | (2006.01) |
| *B60J 5/04* | (2006.01) |
| *B29C 48/00* | (2019.01) |
| *B29K 23/00* | (2006.01) |
| *B29K 709/08* | (2006.01) |
| *B29L 31/30* | (2006.01) |

(52) U.S. Cl.
CPC .............. *B29C 48/16* (2019.02); *B29C 69/02* (2013.01); *B60J 1/004* (2013.01); *B60J 5/0402* (2013.01); *B60J 5/0463* (2013.01); *B60J 10/15* (2016.02); *B60J 10/23* (2016.02); *B60J 10/32* (2016.02); *B60J 10/45* (2016.02); *B60J 10/70* (2016.02); *B60J 10/75* (2016.02); *B60R 13/04* (2013.01); *B60R 13/06* (2013.01); *B29C 48/001* (2019.02); *B29K 2023/12* (2013.01); *B29K 2709/08* (2013.01); *B29L 2031/302* (2013.01); *B29L 2031/3052* (2013.01); *B60Y 2410/123* (2013.01)

(58) Field of Classification Search
CPC ......... B60J 1/004; B60J 5/0402; B60R 13/04; B60R 13/06; B29C 48/16; B29C 45/14409; B29C 45/14434; B29C 69/02
USPC ...... 296/1.08, 146.2, 146.15, 146.16; 49/502
See application file for complete search history.

(56) References Cited

U.S. PATENT DOCUMENTS

| | | |
|---|---|---|
| 4,139,234 A | 2/1979 | Morgan |
| 4,165,083 A | 8/1979 | Dochnahl |
| 4,248,933 A | 2/1981 | Katoh |
| 4,714,392 A | 12/1987 | Muller et al. |
| 4,986,947 A | 1/1991 | Shigeki et al. |
| 5,044,684 A | 9/1991 | Yada |
| 5,112,101 A | 5/1992 | Katcherian et al. |
| 5,137,323 A | 8/1992 | Gross et al. |
| 5,139,302 A | 8/1992 | Kanke |
| 5,139,307 A | 8/1992 | Koops et al. |
| 5,338,087 A | 8/1994 | Gross et al. |
| 5,395,579 A | 3/1995 | Fujihira et al. |
| 5,424,019 A | 6/1995 | Miyakawa et al. |
| 5,491,624 A | 2/1996 | Levran et al. |
| 5,522,191 A | 6/1996 | Wenner et al. |
| 5,620,648 A | 4/1997 | Volkmann et al. |
| 5,711,907 A | 1/1998 | Nozaki et al. |
| 5,846,463 A | 12/1998 | Keeney et al. |
| 6,264,869 B1 | 7/2001 | Notarpietro et al. |
| 6,273,983 B1 | 8/2001 | Miyakawa et al. |
| 6,447,130 B2 | 9/2002 | Chu |
| 6,546,683 B1 | 4/2003 | Senge |
| 6,786,007 B2 | 9/2004 | Aritake |
| 7,582,243 B2 | 9/2009 | Kubo et al. |
| 7,740,466 B2 | 6/2010 | Kubo |
| 8,226,143 B2 | 7/2012 | Takeuchi et al. |
| 8,262,968 B2 | 9/2012 | Smith et al. |
| 8,304,060 B2 | 11/2012 | Katakura et al. |
| 8,328,975 B2 | 12/2012 | Ruppert et al. |
| 8,356,851 B2 | 1/2013 | Lange |
| 8,549,790 B2 | 10/2013 | Murree et al. |
| 8,714,625 B2 | 5/2014 | Kreye et al. |
| 8,765,041 B2 | 7/2014 | Minoura et al. |
| 8,793,934 B2 | 8/2014 | Sato et al. |
| 9,085,219 B2 | 7/2015 | Wade et al. |
| 9,783,134 B2 * | 10/2017 | Mori ................. B60R 13/04 |
| 10,029,544 B2 | 7/2018 | Kramar et al. |
| 2002/0096800 A1 | 7/2002 | Keeney et al. |
| 2005/0006922 A1 | 1/2005 | Mikkaichi et al. |
| 2005/0034411 A1 | 2/2005 | Krause |
| 2005/0084629 A1 | 4/2005 | Gopalan |
| 2008/0001324 A1 | 1/2008 | Kubo |
| 2010/0003523 A1 | 1/2010 | Sharygin et al. |
| 2010/0148530 A1 | 6/2010 | Michler |
| 2010/0186301 A1 | 7/2010 | Drozd et al. |
| 2010/0294442 A1 | 11/2010 | Lange |
| 2011/0183120 A1 | 7/2011 | Sharygin et al. |
| 2011/0187141 A1 | 8/2011 | Yanai et al. |
| 2012/0021182 A1 | 1/2012 | Doan et al. |
| 2012/0240473 A1 | 9/2012 | Minoura et al. |
| 2013/0133267 A1 | 5/2013 | Kanazawa |
| 2013/0232881 A1 | 9/2013 | Adachi et al. |
| 2013/0292874 A1 | 11/2013 | Minoura et al. |
| 2014/0312648 A1 | 10/2014 | Wade et al. |
| 2017/0100996 A1 | 4/2017 | Husek et al. |

FOREIGN PATENT DOCUMENTS

| | | |
|---|---|---|
| CN | 103129485 A | 6/2013 |
| CN | 204109929 U | 1/2015 |
| CN | 204172665 U | 2/2015 |
| DE | 102010034340 A1 | 4/2012 |
| EP | 2033760 A1 | 3/2009 |
| EP | 1737638 B1 | 6/2009 |
| EP | 2300519 A1 | 3/2011 |
| WO | 9747456 A1 | 12/1997 |
| WO | 2010106868 A1 | 9/2010 |
| WO | 2016205799 A1 | 12/2016 |
| WO | 2017132382 A1 | 8/2017 |

OTHER PUBLICATIONS

International Search Report for Application No. PCT/US2016/038373 dated Sep. 8, 2016, 2 pages.
European Search Report for Application EP16204908 dated May 18, 2017, 2 pages.
English language abstract for CN201376273Y extracted from espacenet.com database on Mar. 19, 2018, 1 page.
English language abstract for CN204109929U extracted from espacenet.com database on Mar. 19, 2018, 1 page.
English language abstract for CN204172665U extracted from espacenet.com database on Mar. 19, 2018, 1 page.
English language abstract for EP2033760A1 extracted from espacenet.com database on Mar. 19, 2018, 2 pages.
English language abstract for EP1737638B1 extracted from espacenet.com database on Mar. 19, 2018, 1 page.
English language abstract for EP2300519A1 extracted from espacenet.com database on Mar. 19, 2018, 2 pages.
English language abstract for WO2010106868A1 extracted from espacenet.com database on Mar. 19, 2018, 2 pages.
English language abstract for CN1921997A extracted from espacenet.com database on Jul. 22, 2019, 2 pages.
English language abstract for DE 10 2010 034 340 A1 extracted from espacenet.com database on Jul. 22, 2019, 1 page.
U.S. Appl. No. 16/408,024, filed May 9, 2019.

(56) References Cited

OTHER PUBLICATIONS

English language abstract for CN 103129485 A extracted from espacenet.com database on Feb. 3, 2020, 2 pages.

* cited by examiner

TRIM STRIP ASSEMBLY FOR VEHICLE AND METHOD OF MANUFACTURING SAME

BACKGROUND

1. Field of the Invention

The subject invention relates to a trim strip assembly for a vehicle and method of manufacturing the same, and more specifically, wherein the trim strip assembly includes a first molded trim portion simultaneously formed and bonded to a second extruded trim portion.

2. Description of Related Art

Decorative trim is becoming increasingly popular for consumer vehicles, especially decorative trim having metallic, colored, or otherwise designed appearances. Decorative trim allows vehicle manufacturers to design vehicles having, for example, chrome-like trim and contributes an accented finish to visual design of the vehicles while providing sealing properties for windows of the vehicles. Conventional decorative trim is manufactured using inadequate methods, especially in terms of time and cost. Applying sheets of thin metal to trim is expensive in terms of both material costs for sheets of thin metal and processing costs for bonding the metal to sealing elements of the trim. Conventional methods of applying decorative films to sealing elements of trim including multiple sealing elements is also cost inefficient, as the sealing elements are each manufactured separately, decorative film is applied to each of the sealing elements separately using methods such as heat bonding, and the sealing elements are coupled to one another in a further process. Thus, conventional techniques are inefficient in terms of both time and money.

SUMMARY

One embodiment of a trim strip assembly for a vehicle is provided. The trim strip assembly includes a first trim portion. The first trim portion has a polymeric base and a first decorative member bonded to the polymeric base. The polymeric base is formed of polymeric material molded to the first decorative member. The polymeric base includes a first coupling member. A second trim portion has an extruded base and a second decorative member bonded to the extruded base. The extruded base and the second decorative member are coextruded. The extruded base includes a second coupling member. The first coupling member is bonded to the second coupling member to interconnect the first trim portion and the second trim portion.

One embodiment of a door assembly for a vehicle is provided. The door assembly includes a door frame. A movable window is coupled to the door frame and movable relative the door frame. A fixed window is attached to the door frame and fixed relative the door frame. A first trim portion has a polymeric base and a first decorative member bonded to the polymeric base. The polymeric base is formed of a polymeric material co-molded to the first decorative member. The polymeric base includes a first coupling member. The first trim portion is attached to the fixed window. A second trim portion has an extruded base and a second decorative member bonded to the extruded base. The extruded base and the second decorative member are coextruded and mounted to the door frame adjacent the movable window. The extruded base includes a second coupling member. The first coupling member is bonded to the second coupling member to interconnect the first trim portion with the second trim portion.

One method of manufacturing a trim strip assembly for a vehicle is provided. The trim strip assembly includes a first trim portion and a second trim portion. The first trim portion includes a first decorative member and a polymeric base having a first coupling member. The second trim portion includes a second decorative member and an extruded base having a second coupling member. The extruded base is coextruded with the second decorative member to bond the second decorative member to the extruded base and form the second trim portion having the second coupling member at a distal end. The first decorative member is mounted in a mold. The second trim portion is positioned in the mold with the distal end adjacent the first decorative member. The polymeric base and the first coupling member are simultaneously formed within the mold with the polymeric base bonding to the first decorative member and the first coupling member simultaneously bonding to the second coupling member to interconnect the first molded trim portion and the second extruded trim portion.

The assemblies and method advantageously provide a time- and cost-effective trim strip assembly and a time- and cost-effective method of manufacturing the trim strip assembly. The decorative members are made of thin sheets of relatively inexpensive materials that are easily and inexpensively bonded to the molded and extruded trim portions. The extruded trim portion is coextruded with the decorative trim member that is bonded thereto, thereby efficiently both forming the extruded trim portion and bonding the decorative trim member to the extruded trim portion. The molded trim portion is simultaneously formed and bonded to the decorative trim member that is bonded thereto. The coupling members are formed simultaneously with their corresponding trim members, and are coupled to one another during formation of the molded trim portion. Therefore, the trim strip assembly is made quickly and efficiently, using cost-effective materials and allowing workers to make several trim strip assemblies in a relatively short amount of time. This allows the trim strip assembly to be sold at low cost relative the competition, thereby providing large advantages in the marketplace.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION

Referring to the Figures, wherein like numerals indicate like or corresponding parts throughout several views, aspects of a trim strip assembly 10 for a vehicle and method of manufacturing the same are provided.

I. Assembly Description

Figure 1:
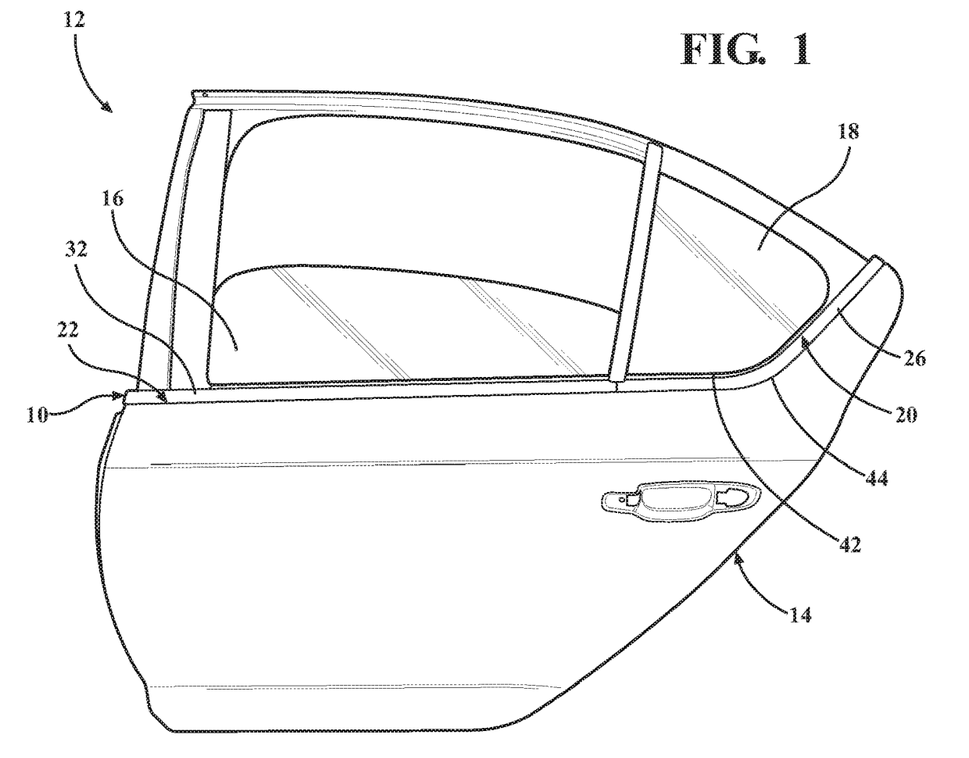
FIG. 1 is a plain view of a door assembly for a vehicle including a door frame, a movable window, a fixed window, a first trim portion, and a second trim portion.

FIG. 1 illustrates an embodiment of a door assembly 12 for a vehicle. The door assembly 12 includes a door frame 14, a movable window 16, a fixed window 18, and a trim strip assembly 10.

The door frame 14 is any door frame for a vehicle suitable for supporting both the movable window 16 and the fixed window 18. The door frame 14 can be a door frame for a car, truck, sports utility vehicle, or any other suitable vehicle. According to some embodiments, the trim strip assembly 10, or trim strip, partially covers and seals interfaces between the door frame 14, the movable window 16, and the fixed window 18. The trim strip assembly 10 also provides a desirable appearance.

The movable window 16 is coupled to the door frame 14. The movable window 16 is a vehicle window that is movable, i.e. opened or closed, relative 16 the door frame 14. In some embodiments, the movable window 16 is moved relative the door frame 14 by an electronic motor system. In other embodiments, the movable window 16 is moved relative the door frame by a crank mechanism. In still other embodiments, the movable window 16 is moved relative the door frame by a human operator. The movable window 16 can be movable relative the door frame by any suitable means. In some embodiments, the movable window 16 is substantially rectangular in shape. In other embodiments, the movable window 16 is substantially triangular in shape. The movable window 16 can be any suitable shape.

Figure 2:
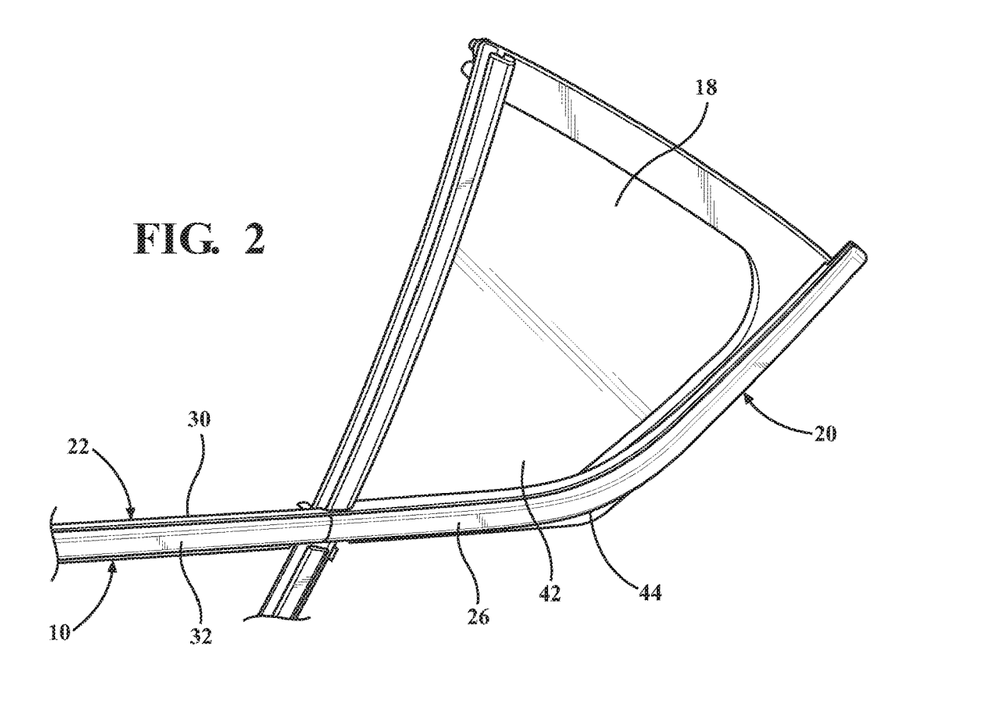
FIG. 2 is a plain view of the fixed window, a polymeric elastomer material, the first trim portion, and the second trim portion.

Referring to FIGS. 1 and 2, the fixed window 18, or fixed side window, is attached to the door frame 14. FIG. 2 illustrates the fixed window 18 and the trim strip assembly 10. The fixed window 18 is fixed, i.e. unable to be raised, lowered, or otherwise moved, relative the door frame 14. FIG. 1 illustrates an embodiment in which the fixed window 18 is attached to the door frame 14 adjacent the movable window 16. In some embodiments, the fixed window 18 is substantially triangular in shape. In other embodiments, the fixed window 18 is substantially rectangular in shape. The fixed window 18 can be any suitable shape.

Figure 3:
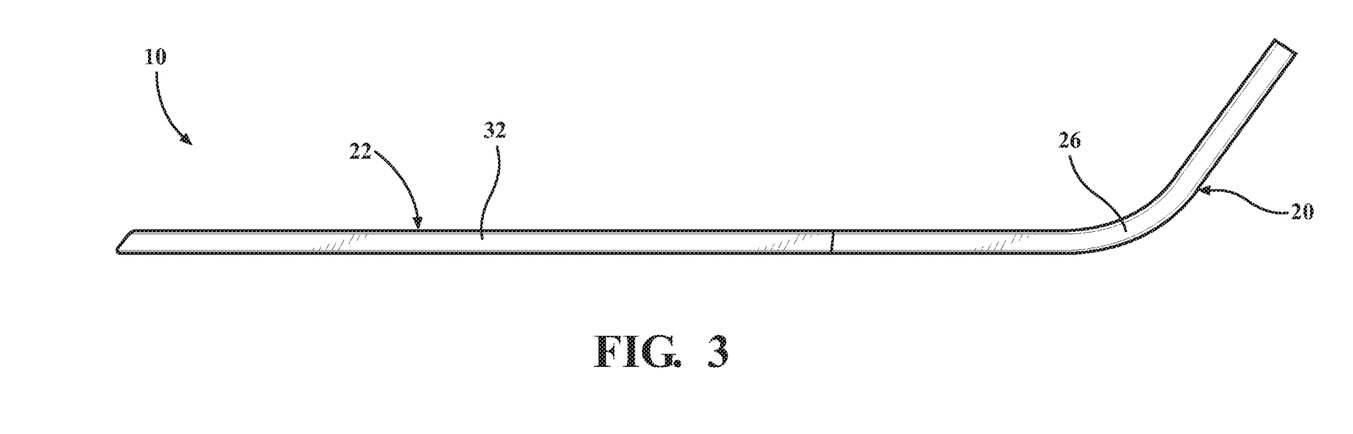
FIG. 3 is a plain view of a trim strip assembly including a first decorative member and a second decorative member.

FIG. 3 illustrates an embodiment of the trim strip assembly 10. The trim strip assembly 10 includes a first trim portion 20 and a second trim portion 22. The first trim portion 20, or molded trim, has a polymeric base 24 and a first decorative member 26 bonded to the polymeric base 24. The polymeric base 24 has a first coupling member 28. The second trim portion 22, or extruded trim, has an extruded base 30 and a second decorative member 32 bonded to the extruded base 30. The extruded base 30 has a second coupling member 36.

The polymeric base 24, or plastic base, is formed of polymeric material by injection molding. In some embodiments, the polymeric base 24 is elastomer. In some embodiments, the polymeric base 24 is rigid polymeric material. In some embodiments, the polymeric base 24 is thermoplastic polymer. In some embodiments, the polymeric base 24 is thermosetting polymer. The polymeric base 24 can be any material suitable for injection molding and bonding to the first decorative member 26.

Figure 7:
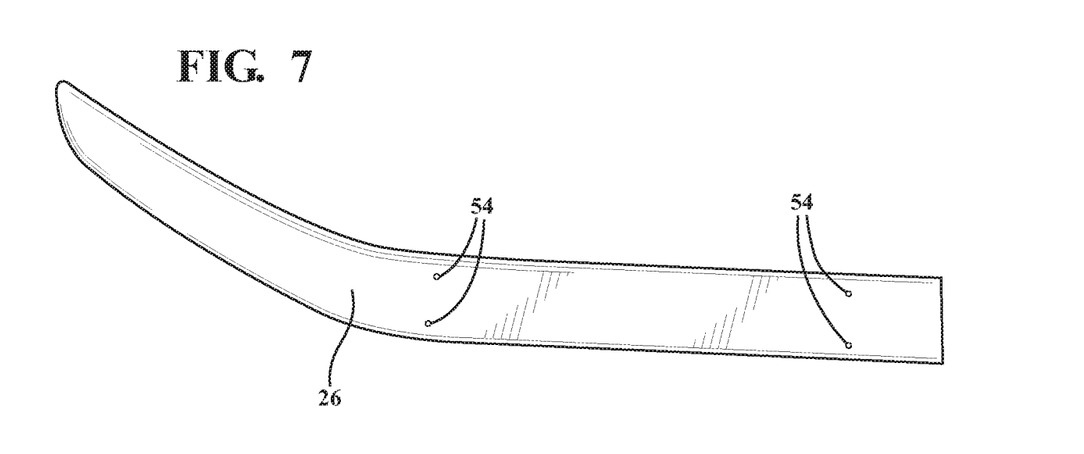
FIG. 7 is a plain view of the first decorative member.

Referring to FIG. 7, the first decorative member 26, or curved foil, is a thin flexible sheet having a desirable appearance. In some embodiments, the first decorative member 26 is at least partially metallic material. In other embodiments, the first decorative member 26 is at least partially vinyl material. In some embodiments, the first decorative member 26 has a chrome-like appearance. In other embodiments, the first decorative member 26 has a wood-like appearance. In still other embodiments, the first decorative member 26 has a color, such as blue or red, and/or a designed appearance, such as a design including stripes or dots. The first decorative member 26 can be any material suitable for bonding to the polymeric base 24 and having a desirable appearance.

In some embodiments, the fixed window 18 has a bottom edge 42 and the first trim portion 20 is bonded to at least a portion of the bottom edge 42 by the polymeric base 24, thereby bonding the trim strip assembly 10 to the fixed window. In some embodiments, the bottom edge 42 is curved and the first trim portion 20 includes a complementary curve 44 to further bond the first trim strip portion 20 to the bottom edge 42 of the fixed window 18.

Figure 4:
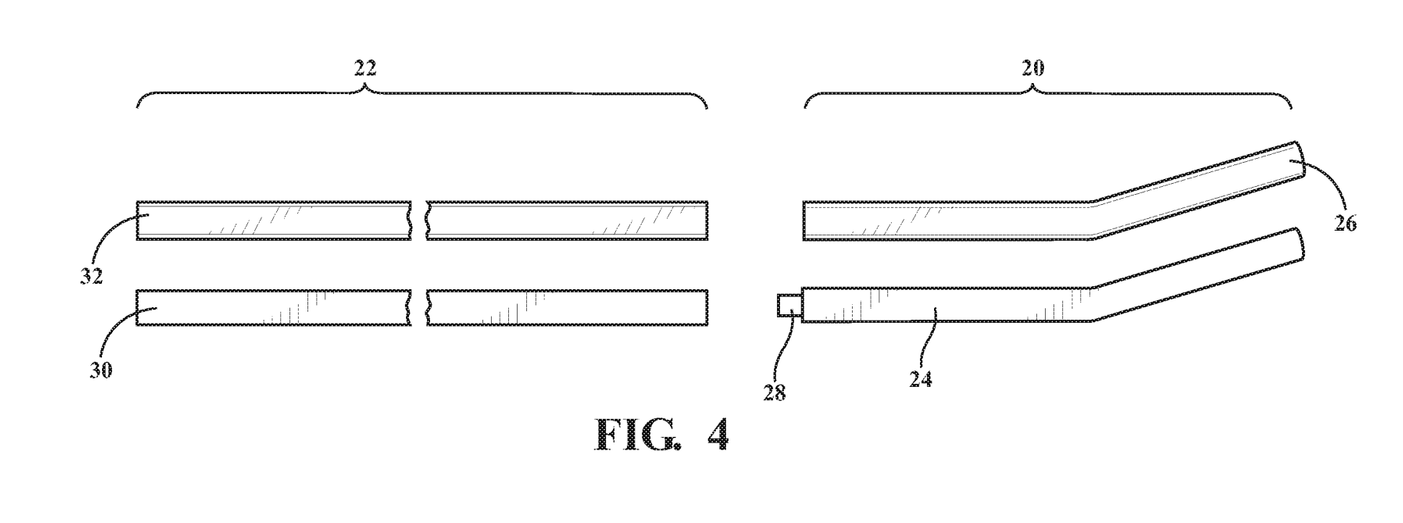
FIG. 4 is a plain view of the first decorative member, the second decorative member, an extruded base, and a molded base including a first coupling member.

Referring to FIG. 4, the first coupling member 28 is a portion of the polymeric base 24 for coupling the first trim portion 20 to the second trim portion 22. In some embodiments, the first coupling member 28 is formed simultaneously with the polymeric base 24. In some embodiments, the first coupling member 28 is formed of the same polymeric material as the polymeric base 24. The first coupling member 28 can be a male component or a female component; i.e. the first coupling member 28 can have one or more protrusions or can define a receptacle for the second coupling member 36. FIG. 4 illustrates an embodiment in which the first coupled member 28 is a polymeric tab. The first coupling member 28 can be any design suitable for coupling the first trim portion 20 to the second trim portion 22.

Figure 5:
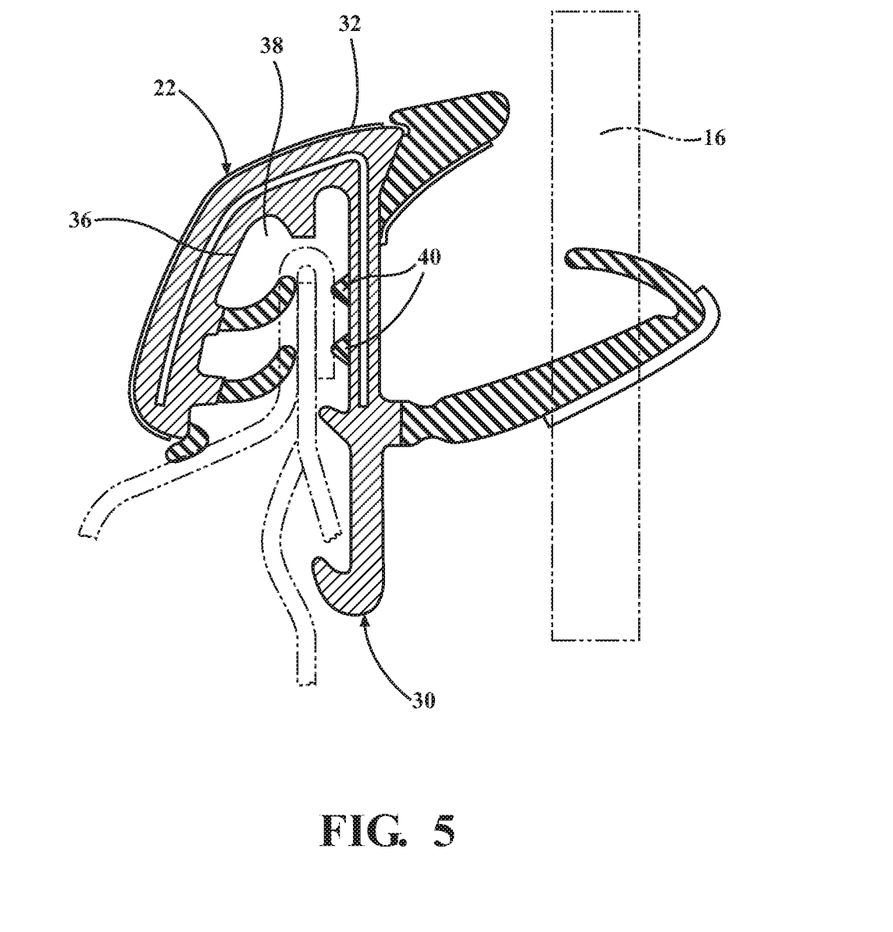
FIG. 5 is a cross sectional view of the second trim portion.

The extruded base 30 is formed by coextrusion with the second decorative member 32 and is bonded with the second decorative member 32 by the coextrusion. FIG. 5 illustrates a cross section of the extruded base 30 according to one embodiment. The extruded base 30 is at least partially formed of polymeric materials, such as elastomer or thermoplastic copolymer. In some embodiments, the extruded base is at least partially metal. In some embodiments, the extruded base couples the trim strip assembly 10 to the door frame 14.

Figure 10:
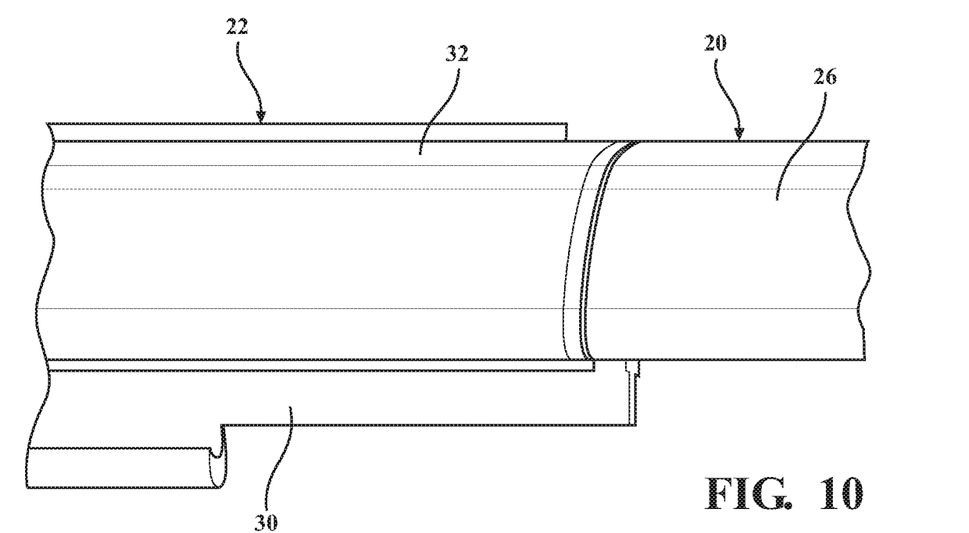
FIG. 10 is a plain view of the first decorative member overlapping the second decorative member.
Figure 11:
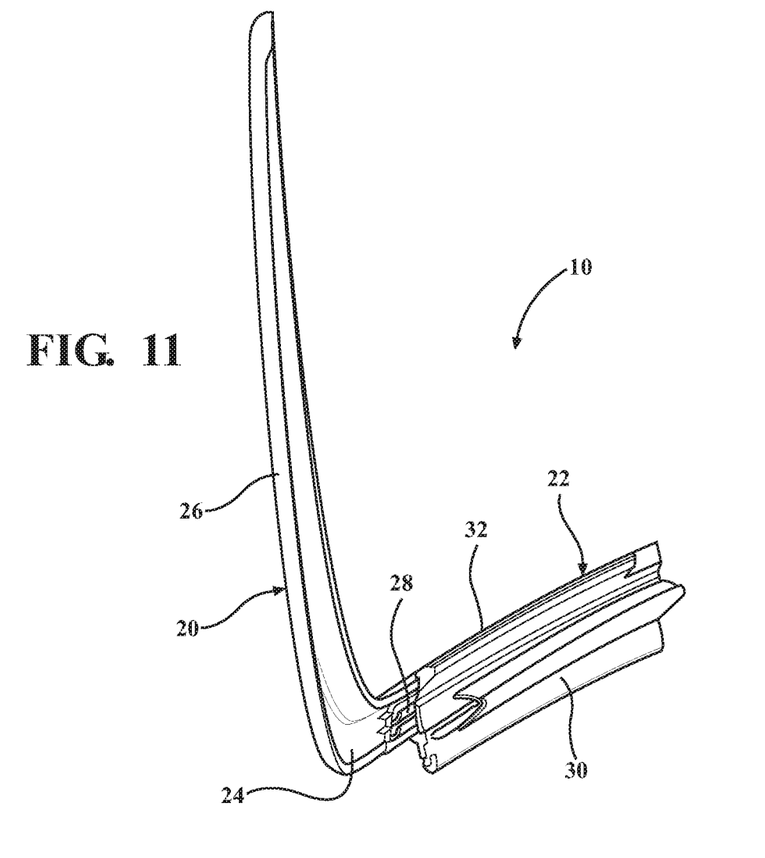
FIG. 11 is a perspective view of the first trim portion bonded to the second trim portion.

The second decorative member 32, or extruded foil, is a thin flexible sheet having a desirable appearance. In some embodiments, the second decorative member 32 is the same material as the first decorative member 26. In some embodiments, the second decorative member 32 is at least partially metallic material. In other embodiments, the second decorative member 32 is at least partially vinyl material. In some embodiments, the second decorative member 32 has a chrome-like appearance. In other embodiments, the second decorative member 32 has a wood-like appearance. In still other embodiments, the second decorative member 32 has a color, such as blue or red, and/or a designed appearance, such as a design including stripes or dots. The second decorative member 32 can be any material suitable for coextrusion with the extruded base base 30 and having a desirable appearance. Referring to FIG. 10, in some embodiments the second decorative member 32 overlaps the first decorative member 26. In some embodiments the first decorative member 26 overlaps the second decorative member 32.

Figure 6:
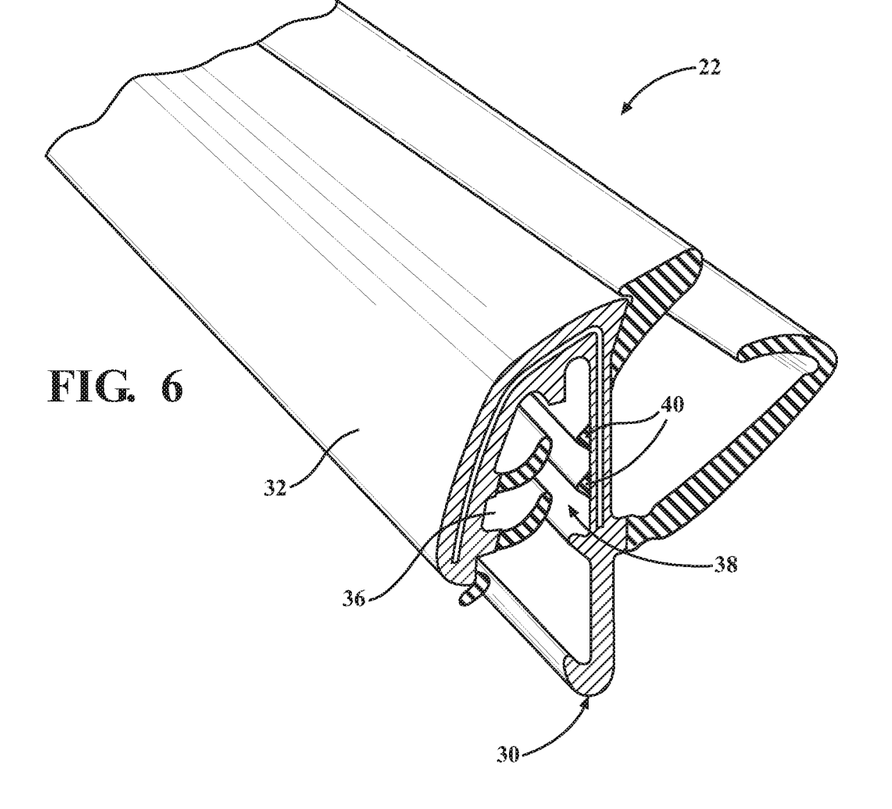
FIG. 6 is a perspective view of a distal end of the second trim portion including a plurality of walls defining a cavity and a plurality of ridges within the cavity.
Figure 8:
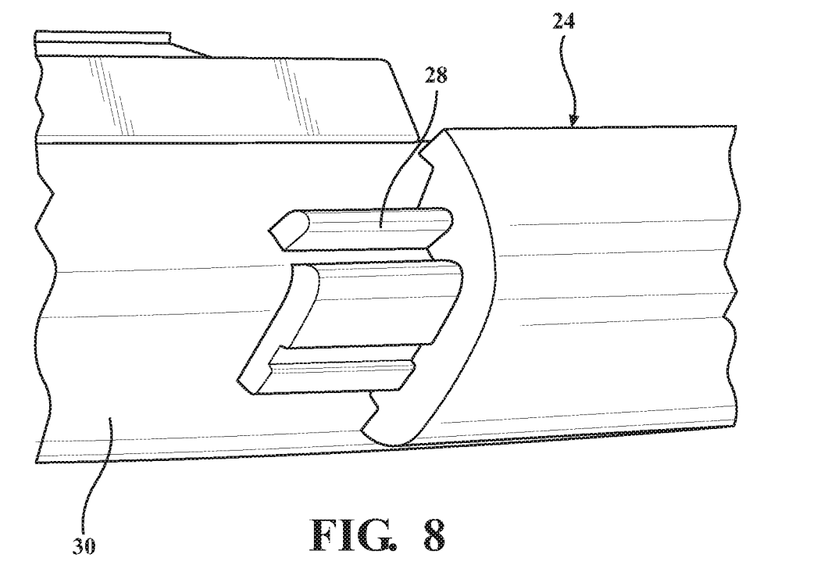
FIG. 8 is a cut-away view of the extruded base, the molded base, and the second coupling member where the second coupling member is a polymeric tab.
Figure 9:
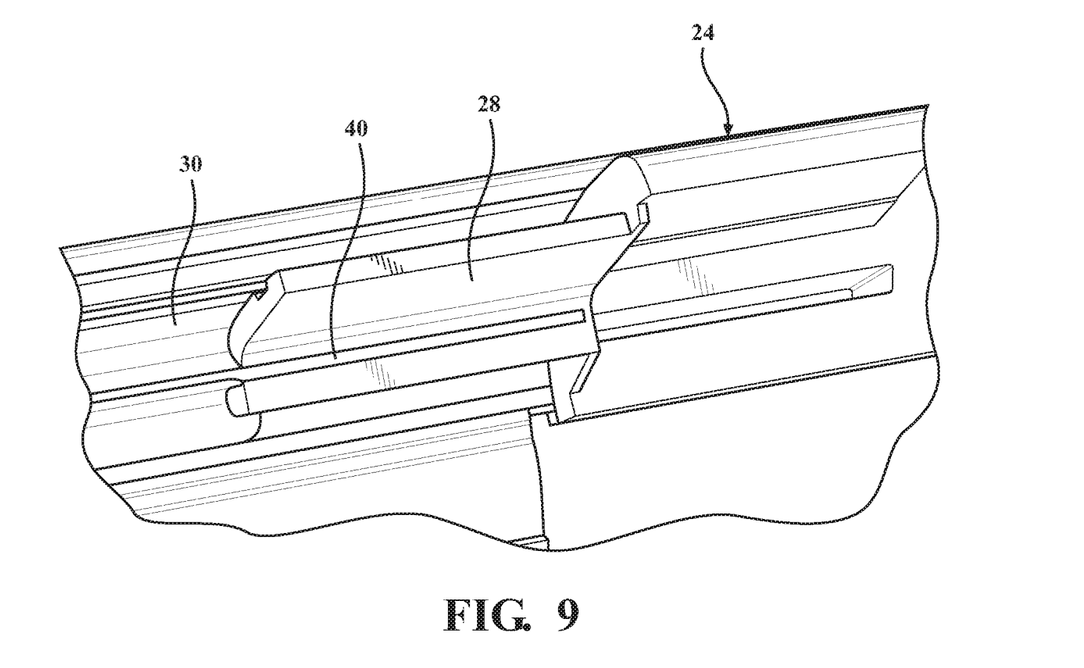
FIG. 9 is another cut-away view of the extruded base, the molded base, and the second coupling member where the second coupling member is a polymeric tab.

Referring to FIG. 6, the second coupling member 36 is a portion of the extruded base 30 for coupling the second trim portion 22 to the first trim portion 20. In some embodiments, the second coupling member 36 is formed simultaneously with the extruded base 30. FIGS. 8 and 9 illustrate various views of the second coupling member 36. In some embodiments, the second coupling member 36 is formed of the same polymeric material as the extruded base 30. The second coupling member 36 can be a male component or a female component; i.e. the second coupling member 36 can have one or more protrusions or can define a receptacle for the first coupling member 28. The second coupling member 36 can be any design suitable for coupling the second trim portion 22 to the first trim portion 20.

FIG. 6 illustrates an embodiment in which the second coupling member 36 has a plurality of walls 36 defining a cavity 38. The plurality of walls 36 can include any suitable number of walls 36. For example, as shown in FIG. 6, the plurality of walls 36 may include two walls. The walls may be substantially as long as the second trim portion extruded base 30. The walls 36 may be as long as is necessary to facilitate an irremovable bond with the first coupling member 28. The walls 36 can have any length suitable for facilitating an irremovable bonded with the first coupling member 28. The cavity 38 may be substantially a parallelepiped. In some embodiments, the cavity 38 is substantially cylindrical. The cavity 38 may have any suitable shape such that the first coupling member 28 is disposed therein and abuts the walls 36.

Figure 12:
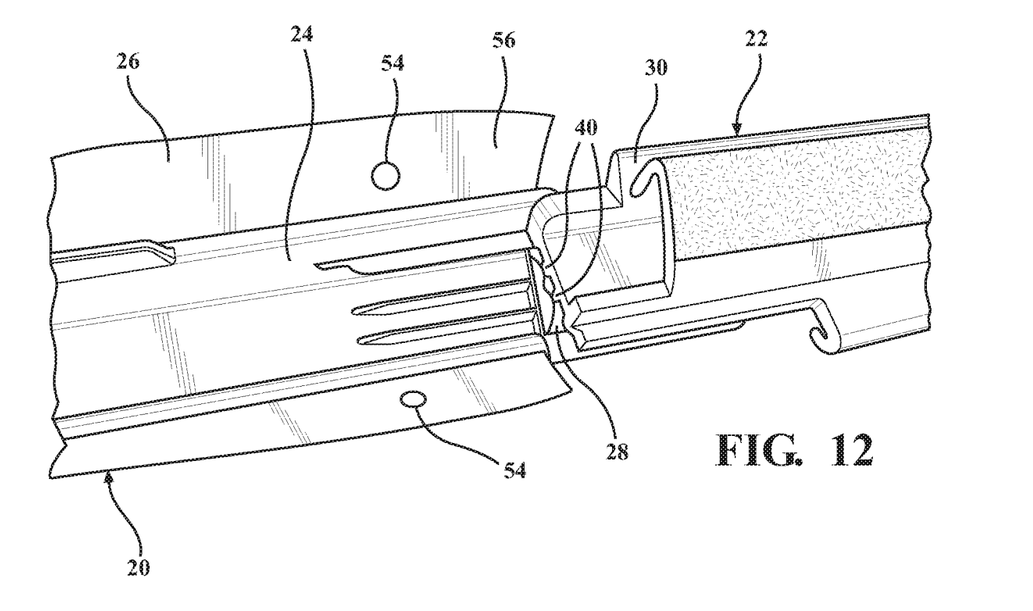
FIG. 12 is a rear perspective view of the first trim portion bonded to the second trim portion.
Figure 13:
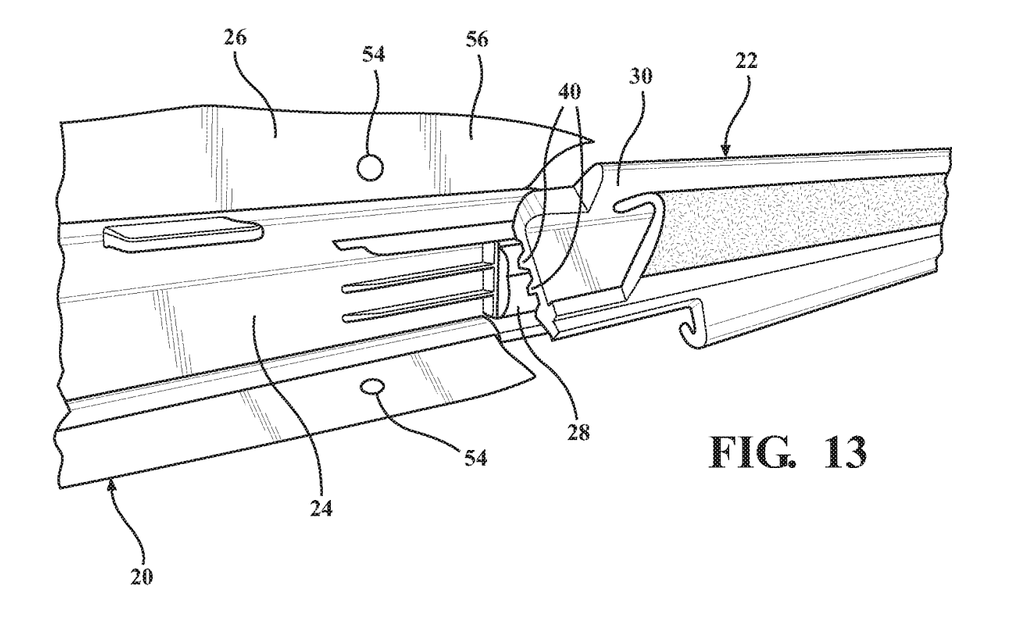
FIG. 13 is a rear perspective view of the first trim portion bonded to the second trim portion.
Figure 14:
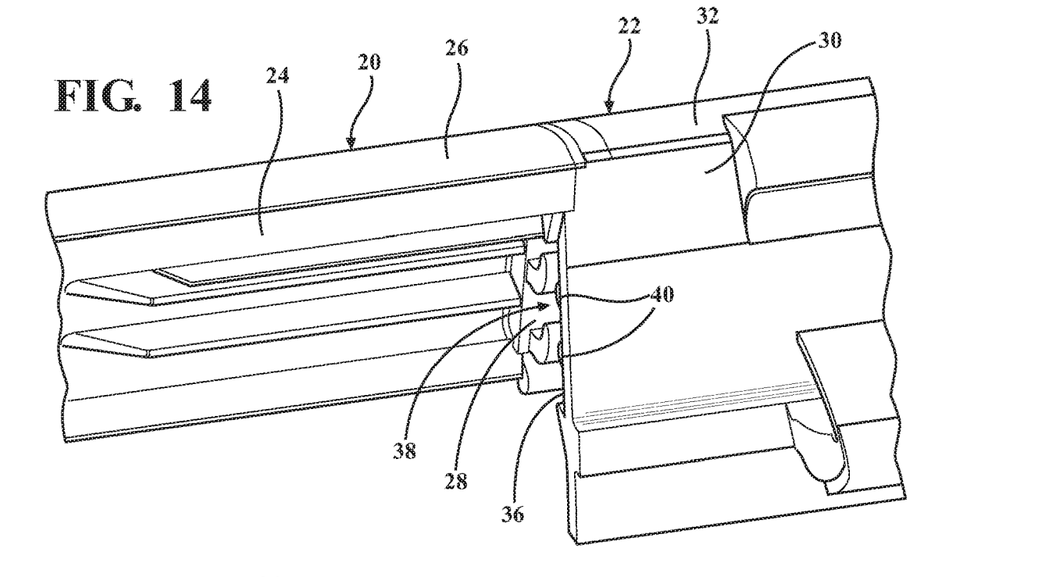
FIG. 14 is a rear perspective view of the first trim portion bonded to the second trim portion.

FIGS. 8 and 9 illustrate an embodiment in which the first coupling member 28 is a polymeric tab 28 that is within the cavity 38 and abuts the walls 36. In some embodiments, the polymeric tab 28 substantially fills the cavity 38. In some embodiments, as shown in FIGS. 12 and 13, the polymeric tab 28 partially fills the cavity 38. The polymeric tab 28 is irremovably bonded to the at least one wall of the plurality of walls 36, and couples the first trim portion 20 and the second trim portion 22.

Figure 15:
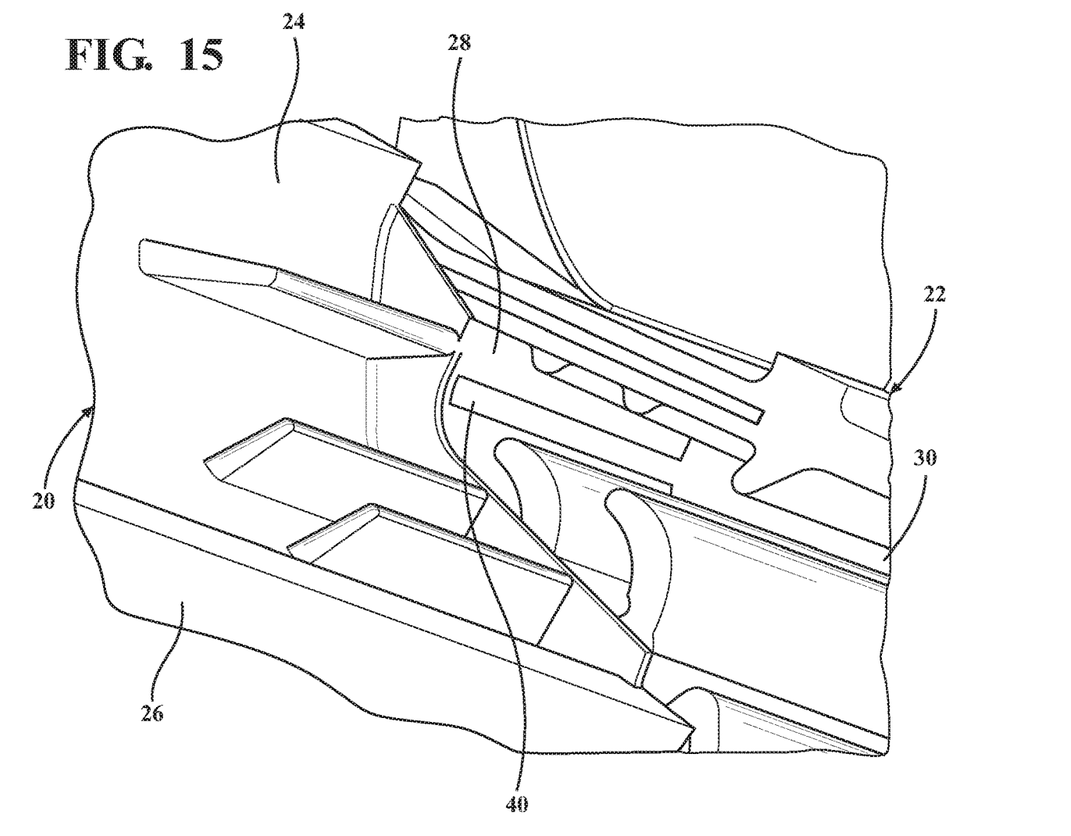
FIG. 15 is a rear perspective view of the first trim portion bonded to the second trim portion.

In some embodiments, as shown in FIGS. 6 and 15, the at least one wall of the plurality of walls 36 includes at least one ridge 40. The polymeric tab 28 may abut the at least one ridge 40, thereby strengthening the bond of the first trim portion 20 and the second trim portion 22 by increasing an area of surface-to-surface contact. In some embodiments, the at least one ridge 40 is integral with the extruded base 30 during coextrusion of the extruded base 30 and the second decorative member 32. In some embodiments, each wall of the plurality of walls 36 includes at least one ridge 40. In some embodiments, the polymeric tab 28 abuts each at least one ridge 40.

Referring to FIGS. 1 and 2, in some embodiments the door assembly 12 includes a polymeric elastomer material 44, or plastic encapsulation. The polymeric elastomer material 44 is polymeric elastomer. The polymeric elastomer material 44 is formed around the fixed window 18 and bonds the fixed window 18 to the door frame 14. In some embodiments, the polymeric elastomer material 44 is formed by injection molding. In some embodiments, the first trim portion 20 is attached to the polymeric elastomer material 44, thereby attaching the trim strip assembly 10 to the door frame 14. The first trim portion 20 can be attached to the polymeric elastomer material by glue, tape, or any other suitable method.

II. Method Description

Referring to FIG. 6, in order to manufacture the trim strip assembly 10, the second trim portion 22 is formed by coextruding the extruded base 30 and the second decorative member 32. The second decorative member 32 and the extruded base 30 are bonded during coextrusion. In some embodiments, the second coupling member 36 is formed during coextrusion. In other embodiments, the second coupling member 36 is formed after coextrusion, such as by overmolding.

Figure 16:
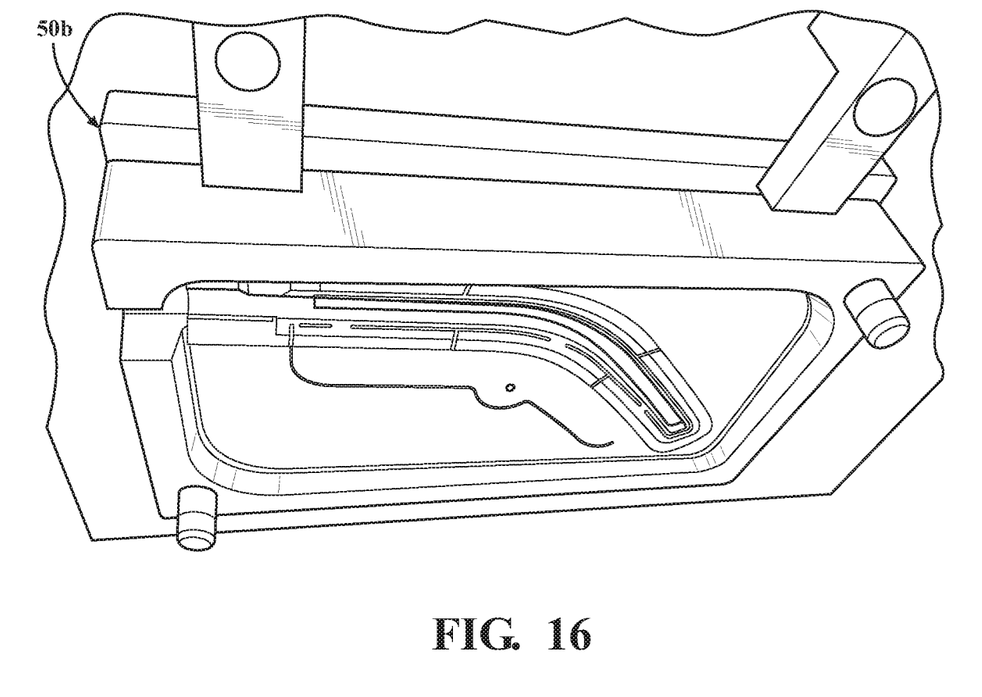
FIG. 16 is a perspective view of a first mold portion of an injection molding machine.
Figure 17:
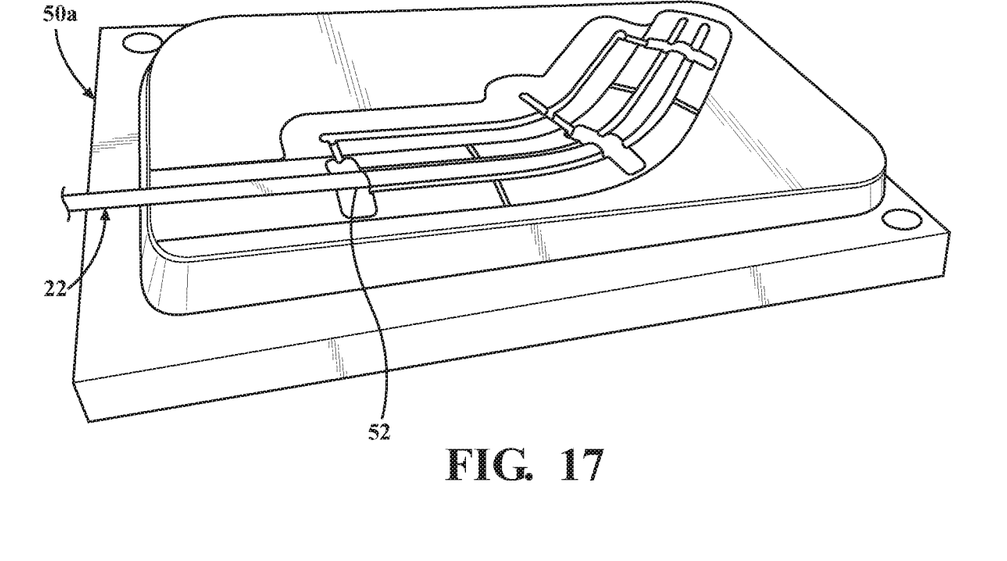
FIG. 17 is a perspective view of a second mold portion of an injection molding machine.

Referring to FIGS. 16 and 17, an injection molding machine having a mold 50a, 50b including a first mold portion 50a and a second mold portion 50b is shown. The first decorative member 26 is mounted in the mold. In some embodiments, the first decorative member 26 is mounted in the first mold portion 50a. In other embodiments, the first decorative member 26 is mounted in the second mold portion 50b. In some embodiments, the first decorative member 26 defines a plurality of pin holes 54. The mold 50a, 50b has a plurality of pins. The first decorative member 26 is mounted within the mold 50a, 50b such that the pins are within the pin holes 54, thereby securing the first decorative member 26 within the mold 50a, 50b.

The second trim portion 22 has a distal end 52. The distal end 52 is positioned in the mold 50a, 50b such that the distal end 52 is adjacent the first decorative member 26. The second coupling member 36 is at the distal end 52 of the second trim portion 22. In some embodiments, the distal end 52 is positioned in the first mold portion 50a. In other embodiments, the distal end 52 is positioned in the second mold portion 50b. In some embodiments, the distal end 52 is positioned such that the first decorative member 26 is overlapping the second decorative member 32.

The polymeric base 24 and the first coupling member 28 are formed simultaneously within the mold 50a, 50b. The polymeric base 24 is bonded to the first decorative member 26 simultaneously with formation of the polymeric base 24. The first coupling member 28 is bonded to the second coupling member 36 simultaneously with formation of the first coupling member 28, thereby interconnecting the first trim portion 20 and the second trim portion 22. In some embodiments, the first coupling member 28 is formed as the polymeric tab 28. The polymeric tab 28 is formed within the cavity 38 abutting the at least one wall of the plurality of walls 36. In another embodiment, the polymeric tab 28 is formed abutting the at least one ridge 40. In some embodiments, the polymeric base is formed by injecting polymeric material into the mold 50a, 50b. In some embodiments, the polymeric material is rigid polymeric material.

Figure 18:
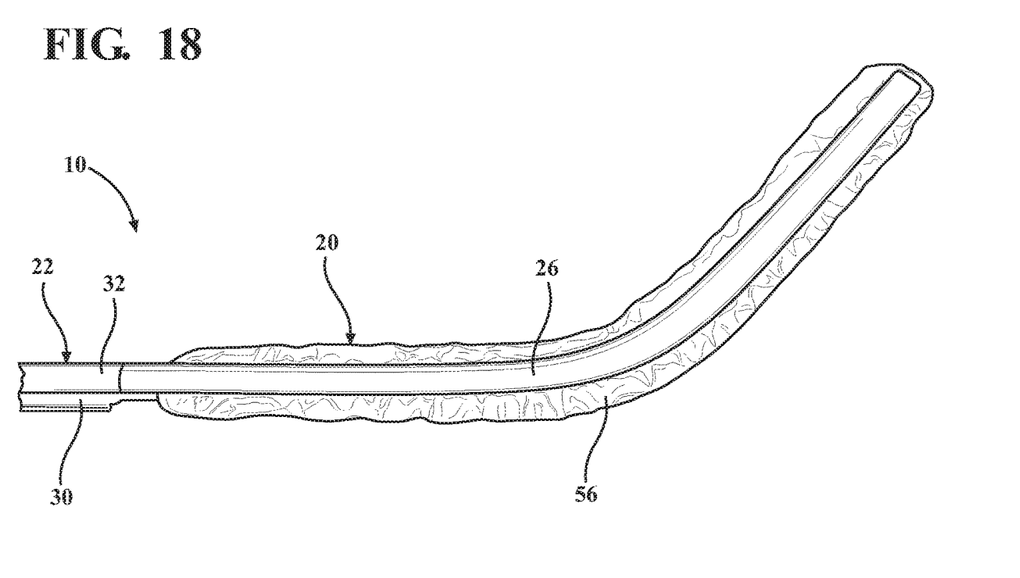
FIG. 18 is a plain view of the first trim portion after being bonded to the second trim portion after being removed from the injection molding machine.
Figure 19:
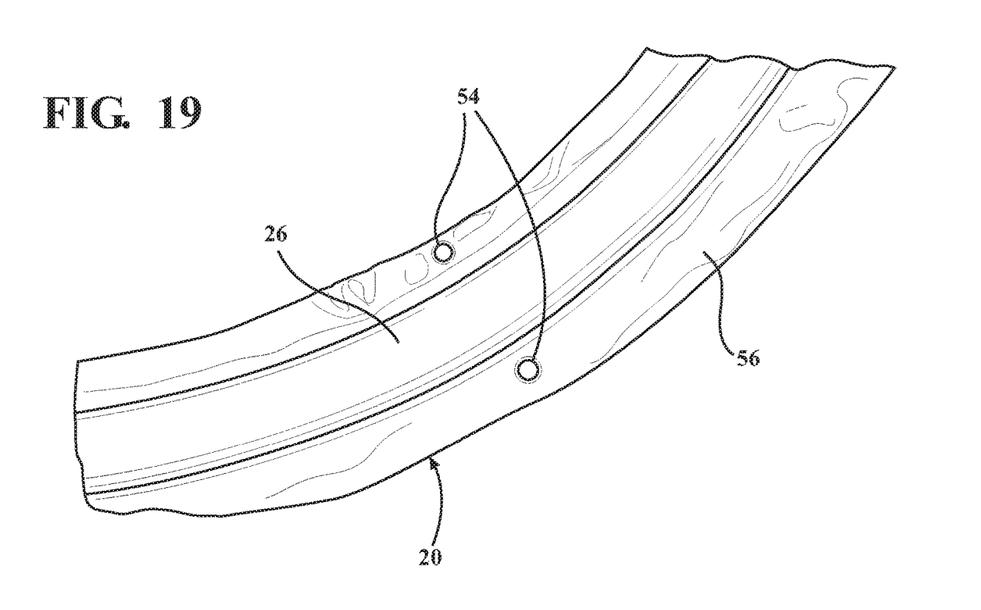
FIG. 19 is a perspective view of the first trim portion after being removed from the injection molding machine.
Figure 20:
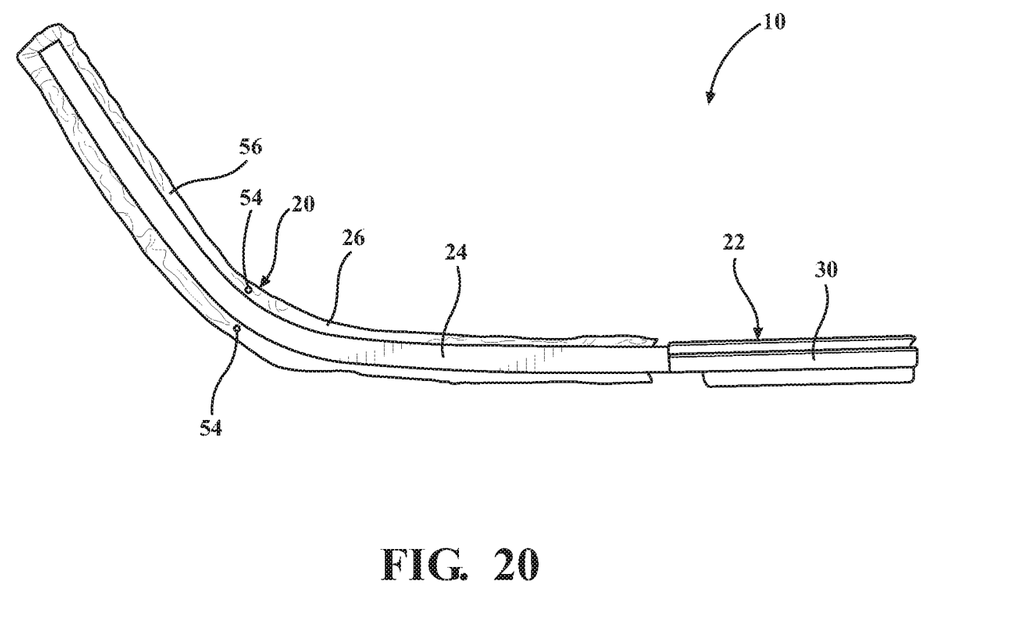
FIG. 20 is a rear plain view of the first trim portion after being removed from the injection molding machine.

In some embodiments, shown in FIGS. 18-20, the first decorative member 26 has excess material 56 after formation of the polymeric base 24. The excess material 56 is removed by any suitable method, such as cutting or shearing.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

The invention claimed is:

1. A door assembly for a vehicle, said door assembly comprising:
    a door frame;
    a movable window coupled to said door frame and movable relative said door frame;
    a fixed window attached to said door frame and fixed relative said door frame;
    a first trim portion having a polymeric base and a first decorative member bonded to said polymeric base with said polymeric base formed of polymeric material co-molded to said first decorative member and said polymeric base including a first coupling member, with said first trim portion attached to said fixed window; and
    a second trim portion a having an extruded base and a second decorative member bonded to said extruded base with said extruded base and said second decorative member being coextruded and mounted to said door frame adjacent said movable window, and said extruded base including a second coupling member with said first coupling member bonded to said second coupling member to interconnect said first trim portion with said second trim portion.

2. The door assembly of claim 1 wherein said second coupling member has a plurality of walls defining a cavity.

3. The door assembly of claim 2 wherein said first coupling member is a polymeric tab formed of polymeric material within said cavity simultaneously during said formation of said polymeric base.

4. The door assembly of claim 3 wherein at least one wall of said plurality of walls includes at least one ridge with said polymeric tab abutting said at least one ridge.

5. The door assembly of claim 3 wherein each wall of said plurality of walls includes at least one ridge with said polymeric tab abutting said at least one ridge of each wall of said plurality of walls.

6. The door assembly of claim 1 wherein said first coupling member is bonded to said second coupling member as said polymeric base is molded to said first decorative member.

7. The door assembly of claim 1 wherein said fixed window includes a bottom edge and said first trim portion is bonded to at least a portion of said bottom edge of said fixed window.

8. The door assembly of claim 7 wherein said bottom edge is curved and said first trim portion includes a complementary curve to further bond to said bottom edge of said fixed window.

9. The door assembly of claim 1 further comprising a polymeric elastomer material bonding said fixed window to said door frame with said first trim portion mounted to said polymeric elastomer material.

10. The door assembly of claim 1 wherein said polymeric material is a rigid polymeric material.

11. The door assembly of claim 1 wherein said first decorative member overlaps said second decorative member of said second trim portion.

12. The door assembly of claim 1 wherein said first decorative member is a thin flexible sheet.

13. The door assembly of claim 1 wherein said second decorative member is a thin flexible sheet.

14. A trim strip assembly for a vehicle, said trim strip assembly comprising:
    a first trim portion having a polymeric base and a first decorative member comprising a thin flexible sheet bonded to said polymeric base with said polymeric base formed of polymeric material molded to said first decorative member, and said polymeric base including a first coupling member; and
    a second trim portion having an extruded base and a second decorative member comprising a thin flexible sheet bonded to said extruded base with said extruded base and said second decorative member being coextruded, and said extruded base including a second coupling member with said first coupling member bonded to said second coupling member to interconnect said first trim portion with said second trim portion.

15. The trim strip assembly of claim 14 wherein said second coupling member has a plurality of walls defining a cavity.

16. The trim strip assembly of claim 15 wherein said first coupling member is a polymeric tab formed of polymeric material within said cavity simultaneously during said formation of said polymeric base.

17. The trim strip assembly of claim 16 wherein at least one wall of said plurality of walls includes at least one ridge with said polymeric tab abutting said at least one ridge.

18. The trim strip assembly of claim 16 wherein each wall of said plurality of walls includes at least one ridge.

19. The trim strip assembly of claim 14 wherein said first coupling member is bonded to said second coupling member as said polymeric base is molded to said first decorative member.

20. The trim strip assembly of claim 14 wherein said first decorative member overlaps said second decorative member.

21. The trim strip assembly of claim 14 wherein said polymeric material is a rigid polymeric material.

22. A method of manufacturing a trim strip assembly for a vehicle with the trim strip assembly having a first trim portion and a second trim portion, the first trim portion including a first decorative member and a polymeric base having a first coupling member and the second trim portion including a second decorative member and an extruded base having a second coupling member, said method comprising the steps of:
    coextruding the extruded base with the second decorative member to bond the second decorative member to the extruded base and form the second trim portion having the second coupling member at a distal end;
    mounting the first decorative member in a mold;
    positioning the second trim portion in the mold with the distal end adjacent the first decorative member; and
    forming the polymeric base and the first coupling member simultaneously within the mold with the polymeric base bonding to the first decorative member and the first coupling member simultaneously bonding to the second coupling member to interconnect the first trim portion and the second trim portion.

23. The method of claim 22 wherein the first coupling member is further defined as a polymeric tab and the second coupling member has a plurality of walls defining a cavity and the step of forming the polymeric base is further defined as forming the polymeric base and the polymeric tab simultaneously within the mold with the polymeric base bonding to the first decorative member, and the polymeric tab simultaneously bonding to the plurality of walls to interconnect the first trim portion and the second trim portion.

24. The method of claim 23 wherein at least one wall of the plurality of walls includes at least one ridge and wherein the step of forming the polymeric base is further defined as forming the polymeric base and the polymeric tab simultaneously within the mold with the polymeric base bonding to the first decorative member and the polymeric tab simultaneously bonding to the plurality of walls such that the polymeric tab abuts the at least one ridge to interconnect the first trim portion and the second trim portion.

25. The method of claim 22 wherein the step of mounting the first decorative member is further defined as mounting the first decorative member in a mold such that the first decorative member overlaps the second decorative member of the second trim portion.

26. The method of claim 22 wherein the step of mounting the first decorative member is further defined as mounting with a plurality of pins the first decorative member in a mold.

27. The method of claim 22 further comprising the step of removing excess portions of the first decorative member after the step of forming the polymeric base and the first coupling member.

28. The method of claim 22 wherein the step of forming the polymeric base is further defined as injecting a rigid thermoplastic polymer into the mold thereby forming a rigid polymeric base and a rigid coupling member simultaneously.

* * * * *